United States Patent Office 3,629,295
Patented Dec. 21, 1971

3,629,295
GLYCIDYL ESTERS OF STERICALLY HINDERED ORGANIC ACIDS
Robert W. Stackman, Morristown, and Anthony B. Conciatori, Chatham, N.J., assignors to Celanese Corporation, New York, N.Y.
No Drawing. Filed May 8, 1969, Ser. No. 823,139
Int. Cl. C07d 1/18
U.S. Cl. 260—348 A      6 Claims

ABSTRACT OF THE DISCLOSURE

Glycidyl esters of the formula:

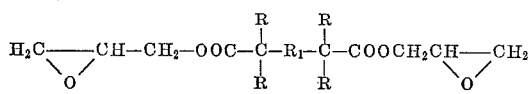

wherein R is selected from the group consisting of alkyl, halogen and aryl and $R_1$ is a single bond, alkylene, arylene or a radical of the formula:

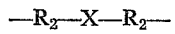

wherein $R_2$ is alkylene, arylene or diarylene and X is a single bond, oxygen, sulfonyl, carbonyl or amino, or substituted derivatives of the alkylene, arylene and diarylene groups, the compounds being useful in the preparation of epoxy resins.

BACKGROUND OF THE INVENTION

Field of the invention

This invention relates to glycidyl esters of sterically hindered carboxylic acids which are useful in the preparation of epoxy resins.

Description of the prior art

Epoxy resins are well-known in the art as an important class of resins useful as cast films and surface coatings as well as in many other areas. These resins have been generally prepared heretofore by the reaction of for example epichlorohydrin and Bisphenol A or from conventional acids such as isophthalic or adipic acids through a base catalyzed condensation reaction. The resulting linear polymers may be modified in various ways and are converted to final products of high molecular weight by the addition of a curing agent.

In the epoxy resins made heretofore, the two reactants condense with the evolution of hydrogen chloride to form a radical with terminal epoxy groups on the hydroxyl substituents. The epoxy resins made from conventional acids heretofore, however, are subject to hydrolytic instability and this drawback therefore causes problems in areas where these conditions are present. Hence, they are more difficult to prepare due to hydrolysis during preparation. The cured resins made from Bisphenol A suffer from lack of resistance to ultra-violet radiation (sunlight) and thus are unstable.

It is also known in the art that neo-acids may be prepared by the addition of carbon monoxide to olefins in the presence of catalysts. For example, the reaction of isobutylene with carbon monoxide in the presence of a hydrogen ion results in the formation of neo-pentanoic acids. This approach may also be employed in the synthesis of bifunctional neo-acids. It is entirely unexpected, however that such acids could be used in the preparation of epoxy resins and intermediates therefor which exhibit outstanding hydrolytic stability. Accordingly, the present invention overcomes these disadvantages of the prior art.

SUMMARY OF THE INVENTION

It is accordingly one object of the invention to provide ester products which overcome or otherwise mitigate these problems of the prior art.

A further object of the invention is to provide glycidyl esters of sterically hindered acids which may be used in the preparation of epoxy resins.

A still further object of the invention is to provide glycidyl esters of sterically hindered organic acids and processes for their production which are stable to hydrolysis and transesterification.

Further objects and advantages of the present invention will become apparent as description thereof proceeds.

In satisfaction of the foregoing object and advantages, there are provided by this invention glycidyl esters of sterically hindered acids, the esters being described by the formula:

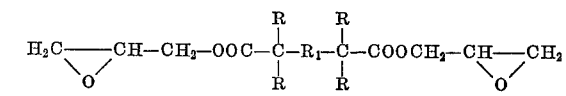

wherein R is selected from the group consisting of straight and branched chain alkyl, halogen and aryl groups and $R_1$ is a single bond, alkylene, arylene or a radical of the formula:

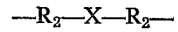

wherein $R_2$ is alkylene, arylene or diarylene and X is a single bond, oxygen, sulfonyl, carbonyl or amino, and the alkyl and halogen substituted derivatives thereof, the compounds being useful in the preparation of epoxy resins.

DESCRIPTION OF PREFERRED EMBODIMENTS

According to this invention there are provided new glycidyl esters of sterically hindered organic acids, the organic acids corresponding to the following general formula:

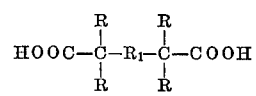

wherein R and $R_1$ are as described above.

Particularly preferred $R_1$ groups, which is true for the starting acids and final product esters, are alkylene groups such as methylene, ethylene, propylene, butylene, etc., up to about 10 carbons, substituted alkylene chains wherein the substituents are one or more halogen or alkyl groups of 1 to 7 carbon atoms, aryl groups such as phenylene and naphthylene, as well as alkyl- and halogen-substituted arylene groups of the formula:

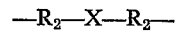

wherein $R_2$ is an alkylene or arylene group such as phenylene or naphthylene, or alkylene, phenylene or naphthylene substituted by alkyl groups or halogen atoms as described above, and X is a single bond, oxygen, sulfonyl, carbonyl or amino. It is to be noted in this regard that the arylene and diarylene groups are inclusive of the para isomers as well as the meta isomer groups.

Especially preferred bridging groups for $R_1$ are those of the following formulae:

(1)

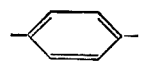

(2)      $[C(R_3)_2]_n$ wherein $n$ is an integer of 1 to about 10, $R_3$ is hydrogen, an alkyl group of 1 to about 7 carbon atoms or halogen;

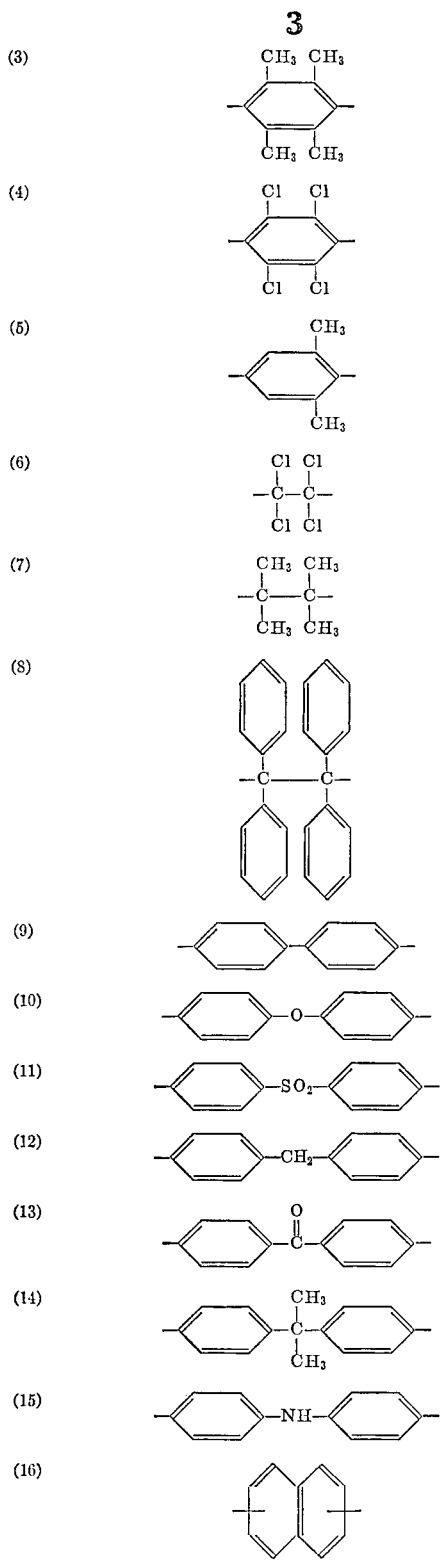

Obviously equivalent bridging groups are also within the scope of the invention.

To form the diglycidyl esters of this invention the above acids are reacted with an epihalohydrin of the formula:

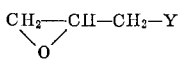

wherein Y is a halogen, preferably chlorine, in the presence of a base, the base being particularly an alkali metal derivative such as sodium hydroxide, potassium hydroxide or lithium hydroxide. In addition, other analogous bases may be employed such as alkaline earth metal hydroxides and the like as well as mixtures thereof.

This reaction is conducted by contacting the dibasic acid and the epihalohydrin a molar ratio of at least 1:2, respectively, under the basic conditions at a temperature of about 50 to 150° C. The reaction therefore is conducted in a solution of the epihalohydrin in admixture with a small amount of an aqueous solution of the basic material employed to catalyze the reaction. Generally, in conducting the reaction, the catalyst solution is added to a hot mixture of the reactants and then the mixture is refluxed until the reaction is complete.

At completion of this reaction the resulting product may be recovered by removal of the excess epihalohydrin as by use of vacuum for evaporation or distillation, dissolving the residue in an aromatic hydrocarbon solvent such as toluene, benzene or xylene and extracting with water. Thereafter, on removal of the aromatic hydrocarbon solvent, the resulting product is recovered as an oil.

If the reaction is found not to be complete, or only a portion of the reactants has gone to the desired diglycidyl ester, which may be determined by measuring the epoxy content by known methods, it is advisable to add an additional portion of basic catalyst and heating to complete the reaction. Analysis of samples of the mixture to determine the weight/epoxy may be employed to determine completion of the reaction.

The resulting products have been found to exhibit excellent hydrolytic stability and no special conditions need be taken during the dehalogenation or heating step of the reaction to prevent hydrolysis of the ester. That is, under the dehalogenation step during the presence of the base, the reaction may be conducted under high temperatures which, under ordinary conditions could be expected to cause the resulting ester to hydrolyze. Thus in the present reaction, the sterically hindered stability of the neo-type acids employed causes the reaction to go to completion with yields of above 80% for the desired product.

The effect of the hindered structure of the neo-acids employed as starting materials in formation of the esters is such as to make the acid groups less reactive to esterification, but once the esters are formed, the neo structures are sterically stabilized to hydrolysis, the latter being the primary advantage to the glycidyl esters. While steric inhibition of hydrolytic esters is a well-established concept, the art is not aware of the particular reaction concerned here and the advantages derived thereby.

As indicated hereinabove, the resulting diglycidyl diesters are important in the preparation of cross-linked epoxy resins. This may be effected by use of curing agents such as primary or secondary amines or hydroxy substituted aliphatic amines such as ethylenediamine, diethylenetriamine, triethylene tetramine, tetraethylenepentamine, N-(hydroxyethyl) diethylenetetramine and the like, all of which are well-known in the art.

In addition, any other curing agent may be used containing a group capable of adding to an epoxy group. Thus there may be mentioned curing agents such as carboxylic acids, carboxylic acid anhydrides, alcohols, amines and mixtures thereof. The only limitation on the curing agent is that it must be of a polyfunctional compound.

The curing reaction to form cross-linked polymers will occur rapidly at room temperature or at elevated temperatures, these reaction being well-known to those skilled in the epoxy resin art.

The structure of the resulting cross-linked epoxy resin will depend on the curing agent or agents used and the ratios of epoxy groups present to curing agents. Hence no definitive structure therefor can be shown.

As indicated, it has thus been found that the diglycidyl esters of the present invention have increased hydrolytic-stability over prior art materials and are resistant to transesterification because of their sterically hindered structure and therefore represent a valuable class of materials for use in the preparation of epoxy resins.

The following examples are presented to illustrate certain specific embodiments of the present invention but are not to be considered limitative thereto.

EXAMPLE 1

Preparation of diglycidyl ester of α,α,α',α'-tetramethyl p-phenylene diacetic acid To a 250 ml. flask was added 2 grams of α,α,α',α'-tetramethyl-p-phenylene diacetic acid (0.05 mole) and 100 grams epichlorohydrin. The mixture was heated with stirring to 80° C., then a solution of 4 grams NaOH in 8 grams of water was added. The mixture was heated ½ hour at reflux, and excess epichlorohydrin was stripped off under vacuum. The residue was dissolved in 25 ml. toluene and extracted three times with water. The toluene solvent was then evaporated to give 15.5 grams (85% yield) of a pale yellow oil. The product analyzed to give a weight/epoxy of 309 which is equivalent to 50% diglycidyl ester and 50% monoglycidyl, monochlorohydrin ester. The above was then dissolved in benzene and treated with 8 grams of a 50% aqueous NaOH solution, which reduced the weight/epoxide to 200.

This diglycidyl diester was then cured in the presence of 5% by weight of triethylenetetramine at room temperature to give a cross-linked epoxy resin polymer.

EXAMPLE 2

This reaction is conducted as in Example 1 except that the starting materials is α,α,α',α'-tetramethyl-p-biphenylene tetraacetic acid and the catalyst is KOH. From this reaction there is recovered a diglycidyl diester of the formula:

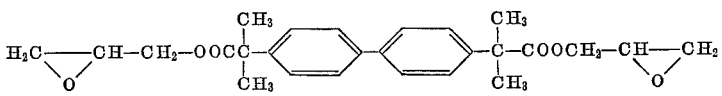

This diester, when cured in the presence of triethylenetetramine gives a cross-linked epoxy resin polymer.

EXAMPLE 3

The reaction of Example 1 is repeated except that the starting material is α,α,α',α'-tetramethyl-p,p'-2,3,5,6-tetramethyl-phenylene diacetic acid. Using the same reaction conditions and techniques, there is recovered the diglycidyl diester of this acid. Curing of this material in the same manner set forth in Example 1 results in a cross-linked epoxy resin.

EXAMPLE 4

The reaction of Example 1 is repeated except that the starting material is 2,2,5,5-tetramethyl adipic acid. Using the same reaction conditions and techniques, the diglycidyl diester is formed which has the following structure:

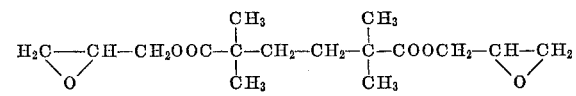

On curing of this material at room temperature with 5% by weight ethylenediamine, a cross-linked epoxy resin is formed.

EXAMPLE 5

The reaction of Example 1 is repeated except that the starting material is α,α,α',α'-tetramethyl-2,3,5,6-tetrachloro-p-phenylene diacetic acid and the basic catalyst is potassium hydroxide. Using the same reaction conditions and techniques, there is obtained a diglycidyl diester of the following structure:

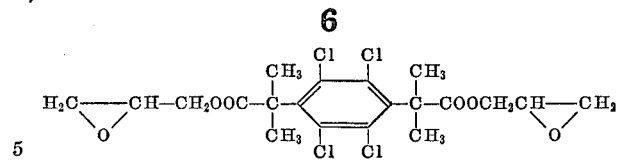

Curing of this diester as in Example 1 results in a cross-linked epoxy resin.

EXAMPLE 6

The reaction of Example 1 is repeated except that the starting material is a diacid of the following formula:

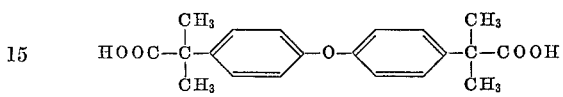

From this reaction there is recovered the diglycidyl diester which on curing as in Example 1 gives a cross linked epoxy resin.

EXAMPLE 7

This example is conducted as in Example 1 except that the starting material is a diacid of the following structure:

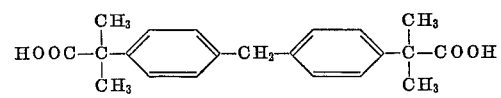

From this reaction there is recovered the corresponding diglycidyl diester which cures to a cross-linked epoxy resin.

The acids employed as starting materials in the process of this invention may be obtained from any suitable source including the reaction of the desired hydrocarbon with carbon monoxide in the presence of hydrogen ion as described hereinbefore. In addition acids of this type may be obtained from other sources. For example p-phenylene bis (dimethylacetic acid) may be obtained by the two-step hydrolysis of the corresponding dinitrile wherein the first step is carried out at a temperature of 90° to 125° C. in the presence of phosphoric acid and the second step is conducted by heating this intermediate at reflux with an alkali metal hydroxide. This process is fully described in U.S. Pat. No. 3,285,956. In addition, acids of the following formula:

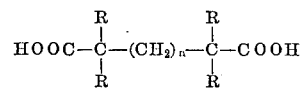

wherein R is alkyl and $n$ is an integer of 1 to 10, may be prepared by a multi-step synthesis involving reacting a 2,2-dialkylacetyl halide with an alkali metal salt of trialkylcarbinol in the presence of liquid ammonia to form a trialkylcarbinyl-2,2-dialkylacetate, reacting this material with metallic sodium in liquid ammonia to give the sodium salt of the trialkylcarbinyl-2,2-dialkylacetate, reacting the latter material with an alkylene dihalide and hydrolyzing the resultant product to produce the 2,2,8,8-tetraalkyl substituted acid. This synthesis is more fully described in U.S. Pat. No. 3,210,404.

In a further procedure for preparing starting materials for use in this invention, diacids of the formula:

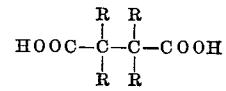

wherein R is alkyl, hydrogen or halogen, may be prepared by the reaction of a compound of the formula:

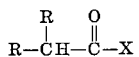

wherein X is hydroxyl, halogen or an alkoxy group, with acetyl peroxide wherein the reactants are mixed at about 0° C. and thereafter heated at temperatures up to about 70–100° C. This synthesis is fully described in U.S. Pat. No. 2,426,224.

Other than the above however, it is to be understood that the diacid starting materials of this invention can be obtained from any suiatble source or made as desired in order to be employed in the instant invention.

The invention has been described herein with reference to certain specific embodiments. However, the invention is not to be considered as limited thereto.

What is claimed is:

1. Glycidyl esters of the formula:

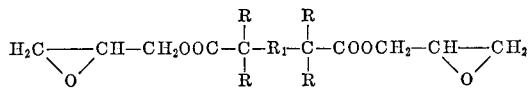

wherein R is selected from the group consisting of an alkyl group of one to about seven carbon atoms, and $R_1$ is selected from the group consisting of the single bond, alkylene, arylene, which may be substituted by one or more alkyl of one to seven carbons or halogen, and a radical of the formula:

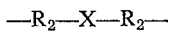

wherein $R_2$ is alkylene of one to about ten carbon atoms or arylene and X is —O—, —$SO_2$—, —CO— or —NH—, and the alkylene and arylene groups may contain one or more substituents selected from the group consisting of alkyl of one to seven carbon atoms and halogen.

2. Glycidyl esters according to claim 1 wherein R is methyl and $R_1$ is selected from the group consisting of phenylene, alkylene of 1 to 10 carbon atoms, tetramethyl phenylene, tetrachloroethylene, tetramethyethylene, tetraphenyl ethylene, biphenylene, bisphenyleneoxy, biphenylenesulfonyl, biphenylene methylene, biphenylenecarbonyl, biphenylene-dimethyl methylene, biphenyleneamino and naphthylene.

3. Glycidyl esters according to claim 1 wherein R is methyl and $R_1$ is ethylene.

4. Glycidyl esters of the formula:

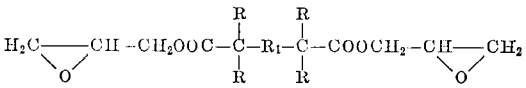

wherein R is an alkyl group of one to about 7 carbon atoms and $R_1$ is phenylene.

5. Glycidyl esters of the formula:

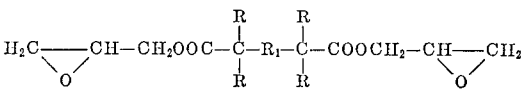

wherein R is methyl and $R_1$ is p-phenylene.

6. Glycidyl esters of the formula:

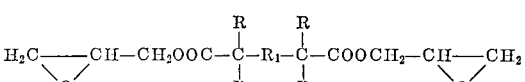

wherein R is methyl and $R_1$ is biphenylene.

References Cited

UNITED STATES PATENTS

| | | | |
|---|---|---|---|
| 3,053,855 | 9/1962 | Maerker et al. | 260—348 |
| 3,057,809 | 10/1962 | Newey | 260—348 |
| 3,178,454 | 4/1965 | Kloos et al. | 260—348.6 |

NORMA S. MILESTONE, Primary Examiner

U.S. Cl. X.R.

260—348.6, 2EP